United States Patent
Orendt et al.

(10) Patent No.: US 11,795,593 B2
(45) Date of Patent: *Oct. 24, 2023

(54) FILTER MEDIUM, FILTER ELEMENT AND USE THEREOF AND FILTER ARRANGEMENT

(71) Applicant: MANN+HUMMEL GmbH, Ludwigsburg (DE)

(72) Inventors: Stefan Orendt, Neudrossenfeld (DE); Thomas Pemsel, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 156 days.

This patent is subject to a terminal disclaimer.

(21) Appl. No.: 16/585,812

(22) Filed: Sep. 27, 2019

(65) Prior Publication Data

US 2020/0024781 A1 Jan. 23, 2020

Related U.S. Application Data

(63) Continuation of application No. PCT/EP2018/057973, filed on Mar. 28, 2018.

(30) Foreign Application Priority Data

Mar. 28, 2017 (DE) .......................... 102017002957.1

(51) Int. Cl.
*D04H 3/147* (2012.01)
*B01D 39/16* (2006.01)
*D04H 3/018* (2012.01)

(52) U.S. Cl.
CPC ........... *D04H 3/147* (2013.01); *B01D 39/163* (2013.01); *D04H 3/018* (2013.01); *B01D 2239/0216* (2013.01); *B01D 2239/0627* (2013.01)

(58) Field of Classification Search
CPC .... B01D 2239/0216; B01D 2239/0627; B01D 39/1623; B01D 39/163; D04H 3/018; D04H 3/147
See application file for complete search history.

(56) References Cited

U.S. PATENT DOCUMENTS

| 5,783,503 | A | 7/1998 | Gillespie et al. |
| 5,970,583 | A | 10/1999 | Groten et al. |
| 6,169,045 | B1 | 1/2001 | Pike et al. |

(Continued)

FOREIGN PATENT DOCUMENTS

| CA | 2489263 A1 | 6/2005 |
| CN | 1059842 C | 12/2000 |

(Continued)

*Primary Examiner* — Magali P Slawski
*Assistant Examiner* — Brad Gordon

(57) ABSTRACT

A filter medium (10) for filtering a fluid, in particular for use in an interior air filter (32), comprises a spun-bonded nonwoven formed at least in part of multi-component segmented pie fibers (1) having at least a first plastic component (2) and a second plastic component (3). The multi-component fibers (1) are largely non-split, and in order to manufacture same, segmented pie filaments are spun in a spun-bonding process (S4) to form a spun-bonded nonwoven (10). The segmented pie filaments then form the multi-component fibers (4), the first plastic component (2) and/or the second plastic component (3) being made in particular of a polypropylene.

29 Claims, 6 Drawing Sheets

(56) References Cited

U.S. PATENT DOCUMENTS

| | | |
|---|---|---|
| 6,444,312 B1 | 9/2002 | Dugan |
| 2002/0013111 A1* | 1/2002 | Dugan .................. D04H 1/495 428/397 |
| 2003/0045192 A1 | 3/2003 | Midkiff et al. |
| 2003/0203695 A1 | 10/2003 | Polanco et al. |
| 2006/0005518 A1 | 1/2006 | Duffy et al. |
| 2007/0207317 A1 | 9/2007 | Willingham et al. |
| 2007/0220852 A1 | 9/2007 | Lifshutz et al. |
| 2008/0276805 A1 | 11/2008 | Lotgerink-Bruinenberg |
| 2010/0159770 A1 | 6/2010 | Walser et al. |

FOREIGN PATENT DOCUMENTS

| | | |
|---|---|---|
| CN | 102614713 A | 8/2012 |
| DE | 10011569 A1 | 9/2001 |
| DE | 102007023806 A1 | 11/2008 |
| DE | 102011009227 A1 | 7/2012 |
| EP | 0702994 B1 | 3/1996 |
| EP | 0864006 B1 | 9/1998 |
| EP | 0874677 B1 | 11/1998 |
| EP | 1024940 A1 | 4/1999 |
| EP | 0914508 B1 | 5/1999 |
| EP | 1212478 A1 | 12/2000 |
| EP | 1076121 A1 | 2/2001 |
| EP | 1091028 B1 | 4/2001 |
| EP | 1149424 B1 | 10/2001 |
| EP | 1560969 B1 | 8/2005 |
| EP | 1641966 B1 | 4/2006 |
| EP | 1907201 B1 | 4/2008 |
| EP | 2321029 A2 | 1/2010 |
| EP | 2370622 A2 | 7/2010 |
| EP | 2539053 A2 | 9/2011 |
| EP | 2561127 A1 | 10/2011 |
| EP | 2479331 B1 | 7/2012 |
| EP | 2741838 A2 | 2/2013 |
| WO | 2014149750 A1 | 9/2014 |
| WO | 2016016848 A1 | 2/2016 |

* cited by examiner

FILTER MEDIUM, FILTER ELEMENT AND USE THEREOF AND FILTER ARRANGEMENT

CROSS-REFERENCE TO RELATED APPLICATIONS

This application is a continuation application of international application No. PCT/EP2018/057973 having an international filing date of 28 Mar. 2018 and designating the United States, the international application claiming a priority date of 28 Mar. 2017 based on prior filed German patent application No. 102017002957.1, the entire contents of the aforesaid international application and the aforesaid German patent application being incorporated herein by reference to the fullest extent permitted by the law.

TECHNICAL FIELD

The present invention relates to a filter medium, a filter element and uses thereof and a filter arrangement.

When filtering fluid media, such as air for the interior of a vehicle or building, filter media are used. Known filter media are, for example, papers, foams, fabrics and nonwovens, which are also referred to as nonwoven materials. The present invention relates to nonwovens and combinations with nonwovens as filter media.

Although filter media are conceivable for various fields of application, in the present case, particular attention is given to the problem of filtering in the area of HVAC (Heating, Ventilation and Air Conditioning) and of supply air for the interior of a motor vehicle. However, the described filter elements and filter media may also be used in other applications, for example as a filter for fuel cells, for fans or for switch cabinets or serve as a suction filter for engines or compressors.

Filter media are processed in the manufacture of filter elements, for example, filter media are laminated, embossed, pleated, pleated or cut. For these processing steps, the filter media must be suitable. Likewise, filter media for further processing steps such as injecting, foaming or foam-coating, gluing or bonding must be suitable.

The increasing air pollution, especially in large cities, in connection with the use of modern air conditioners makes it necessary that, for example, the treated or conditioned air which is conducted into the interior of a motor vehicle or a house be purified by means of suitable filters. For this purpose, for example, particulate filter, odor filter or their combination with each other come into consideration, which should filter or adsorb suspended solids, particulate matter and odors contained in the ambient air as well as possible.

For filtering air, in particular for the interior of a motor vehicle, pleated or pleated filter media, which form a pleat pack, are frequently used. For this purpose, an initially flat filter material sheet is pleated in a zigzag or wavy shape. The pleat pack is held, for example, by sidebands and headbands or another frame. Such filter elements can be fixed exchangeably in a filter holder. The filter assembly formed thereby may be in an air conditioner of a corresponding motor vehicle. The formation of pleats can maximize the filter area in a given size and thereby lower the media speed and the flow rate through the filter medium. As a result, for example, a lower flow resistance and a higher filtration efficiency can be achieved or service life can thereby be increased.

BACKGROUND

In principle, nonwovens are known as filter media. Depending on the application, the filter medium requires a certain rigidity, a certain retention capacity for particles in the fluid to be filtered, a certain permeability or a certain pressure loss and certain material properties. For example, nonwoven composites have been proposed, which are solidified by means of a hydroentanglement and are mounted on a support structure. DE 10 2011 009 227 A1, for example, discloses a method for producing a corresponding nonwoven in which a hydro-dynamic needling is achieved in order to produce wet or dry felts.

EP 2 479 331 B1 proposes to split multi-component fibers, which are processed as spun-bonded nonwovens, in order to obtain a particularly fine fiber structure. In this case, multilayer nonwovens are produced in particular for use in hygiene products.

From US 2002/0013111 A1, splittable polyester fibers of several components are known. The fibers are processed and needled as staple fibers into a flat material. According to US 2002/0013111 A1, a hydrodynamic entanglement with water jets is performed, which split the several components of the individual fibers and wherein particularly thin and fine fiber structures arise.

Often nonwovens also contain bicomponent fibers as so-called core-sheath fibers. For example, US 20070220852 A1 describes a spun-bonded nonwoven having core-sheath fibers as binder fibers as the filter medium. Here, the core has, for example, a higher melting point than the sheath, so that by heating to the softening or melting temperature of the sheath, a compound of the binder fibers with each other and with other fibers of the nonwoven is made possible and thereby a stable nonwoven is achieved.

DISCLOSURE OF THE INVENTION

It is therefore an object of the present invention to provide an improved filter medium based on a spun-bonded nonwoven, in particular for use as an interior air filter, e.g. in vehicles, or in the area of HVAC, for example in building technology. It is a further object to provide an improved or alternative filter element for a filter arrangement.

Filter Medium: Geometry

Accordingly, a filter medium for filtering a fluid with a spun-bonded nonwoven is proposed, which is formed at least partially from segmented, in particular multi-component segmented pie fibers with at least one first plastic component and a second plastic component.

Multi-component segmented pie fibers are also known in the literature and technology as segmented pie fibers. If multi-component fibers have essentially two components, they are referred to as bicomponent fibers. Other configurations of multi-component fibers are, for example, core sheath fibers in which a core of one component is surrounded by a sheath of another component. Side-by-side configurations of multi-component fibers are also known.

The flat filter medium is particularly suitable for use in an interior air filter for supplying air in a motor vehicle or in HVAC applications. It has been found that multi-component segmented pie fibers obtained by a spun-bonding process have favorable filtration properties. Multi-component fibers may also be referred to as poly or multicomponent fibers.

By "segmented" it is meant that there are interfaces between the various plastic components substantially along the length extension of the fibers. It is not excluded that further segments or plastic components extending along the length extension are present within the multi-component fibers. In the cross-section of a corresponding multi-component fiber, it results in a view in the manner of pie pieces, which are formed of different plastic components.

In principle, it is conceivable that the term "plastic component" does not mean that the segments have different compositions. Interfaces between the segments could also be generated by the production process. In the context of this invention, however, the term plastic component describes the composition of the material of a segment, and in the case of a multi-component fiber at least two different compositions are present.

In embodiments, the multi-component fibers of the spun-bonded nonwoven used as a filter medium have a substantially pie-shaped cross-section. In comparison to conventional spun-bonded nonwovens in which the multi-component fibers are essentially split when used as a filter medium. There, the fiber sections resulting from the components usually have an irregular, for example, triangular cross-section.

In embodiments of the filter medium, a respective multi-component segmented pie fiber has a sheath surface, and the plastic components adjoin one another on the sheath surfaces of the multi-component fibers.

In embodiments, the sheath surface has longitudinal grooves along interfaces between the plastic components of a respective multi-component fiber. For example, the longitudinal grooves may result in the manufacturing process by melting or due to the surface tension of the still liquid plastic material during spinning. Substantially, a respective multi-component fiber may have a smooth surface. For example, it is conceivable that the sheath surface has an average roughness depth of less than 2 µm along a circumference.

The boundary layers or interfaces between the plastic components extending along the length extension of the multi-component fibers can lead to an improved filtering effect. Electrical charges or geometric transitions, such as edges or grooves, can improve the collection of particles from the fluid to be filtered.

Depending on the desired properties of the filter medium, the multi-component segmented pie fibers can be present in different fiber thicknesses. In certain embodiments of the filter medium, the multi-component segmented pie fibers have an average diameter of between 10 µm and 40 µm, preferably between 15 µm and 30 µm.

In other embodiments, the average diameter is between 20 µm and 60 µm, and is preferably between 30 µm and 40 µm.

In the proposed multi-component fibers, the respective first and second plastic components adhere to one another and, as a whole, form the segmented pie fiber. Known filter media comprising multi-component fibers which are split, felted or needled tend to have smaller mean diameters.

In embodiments, the multi-component segmented fibers include at least four, six, or eight pie segments. 16 pie segments are preferred, but a higher number of pie segments is also possible. For example, at 16 pie segments along the length of a respective multi-component fiber, there are also 16 interfaces of the plastic components to one another. These interfaces may be beneficial to the filtration properties. However, the number of interfaces must be weighed against an efficient production process.

The multi-component fibers can be designed so that they do not split apart under the influence of a water jet treatment. For example, a good adhesion of the same can be adjusted to one another by the choice of the plastic components. By obtaining the multi-component fibers as non-split fibers, the filter media becomes robust and, on the other hand, particularly efficient.

However, a water jet treatment or another treatment which results in the splitting of the multi-component fibers or a majority of the multi-component fibers can also be avoided in the production of the nonwoven and its processing to the filter element. In other words, according to the invention it is also a spun-bonded nonwoven from a multi-component fiber in a segmented pie configuration, which is used as a filter medium without being hydroentangled.

In embodiments, a proportion of multi-component fibers in the filter medium, in which the pie segments are interconnected at inner segment boundaries of the multi-component fibers along their length extension, is at least 50%. Preferably, at least 70% of the multi-component fibers are correspondingly non-split, and more preferably at least 80%. The proportion can be determined, for example microscopically, by examining fibers from a predetermined area of the spun-bonded nonwoven with regard to the splitting of their plastic components.

In embodiments of the filter medium, with a length fraction of the multi-component fibers of not more than 50%, the pie segments of the multi-component fibers are split from one another. Preferably, less than 30% of the multi-component fibers are split in length, and more preferably at most 20% of the multi-component fiber length is split. In a length fraction, a respective fiber or a fiber section can be examined, and the length fraction of contiguous pie segments can be checked with the length fraction of pie segments split apart from one another. This results in the length fraction of the multi-component fibers that are split or non-split.

In embodiments of the filter media, the multi-component fibers of the spun-bonded nonwoven are oriented along the machine direction. The machine direction results, for example, by depositing spun-bonded nonwoven filaments on a movable storage screen belt.

In the filter medium, the plastic components are interconnected. The plastic components are interconnected in a spun-bonding process. It is also conceivable that the plastic components or segments are partially fused together in areas of the boundaries between the first and the second plastic component. This can result in a particularly good adhesion of the segments together.

In embodiments, the filter medium or the multi-component fibers are connected to one another by means of a hot air bonding, in particular exclusively interconnected to one another by means of a hot air bonding. The spun-bonded nonwoven then has a thickness between 1.0 and 2.0 mm. Preferably, the thickness is between 1.2 and 1.8 mm, and more preferably between 1.3 and 1.7 mm. With a thickness of between 1 and 2 mm, a favorable further processability of the pre-solidified spun-bonded nonwoven, which can also be referred to as semi-finished product, results, for example, for further densification or solidification.

In embodiments of the filter medium, the multi-component fibers are bonded together under thermal exposure to form a nonwoven. This can be achieved, for example, by irradiation of heat or hot air on the spun-bonded nonwovens running on screen belts. The spun-bonded nonwoven has, for example, a thickness between 0.5 and 1.5 mm, preferably between 0.8 and 1.3 mm, after the additional thermal exposure. By densification or solidification of the medium initially provided as a nonwoven, an improved mechanical resistance is achieved.

The stated thicknesses provide good filtration properties for a corresponding spun-bonded nonwoven with preferably non-split or mostly non-split multi-component fibers. For example, the number of interfaces between different plastic components plays a role, as well as the distance from corresponding interfaces between different fibers in the spun-bonded nonwoven.

In further embodiments of the filter medium, the spun-bonded nonwoven has pleats with a plurality of pleating sections arranged between pleat edges. The spun-bonded nonwoven, due to its mechanical properties and the multi-component fibers which are at least partially, preferably mostly, non-split, has a good form stability, which is suitable for pleating. The pleats can preferably run transversely to the machine direction, so that oriented fibers are pleated or kinked in their length.

Filter Medium: Physical Properties

In embodiments, the plastic components of the multi-component fibers are charged as electrets. That is, charges are accumulated on the plastic components. It is conceivable that the different plastic components, although they may have the same material composition, have a different charge configuration. As a result, in particular at the boundary surfaces of the pie segments, a special electric field configuration results, which can have an advantageous effect on the filtration property.

The filter medium comprises in embodiments a spun-bonded nonwoven with a grammage
between 80 and 160 g/m$^2$. The so-called grammage is measured in particular according to DIN 29073-1. Preferably, the grammage may be between 90 and 110 g/m$^2$. In other embodiments, the grammage is set between 80 and 100 g/m$^2$, and in still other embodiments between 110 and 150 g/m$^2$.

In embodiments, the spun-bonded nonwoven in particular has a flexural rigidity of greater than 170 mN, preferably greater than 180 mN, and more preferably greater than 200 mN. A measurement of the flexural rigidity is carried out in particular according to DIN 53121 according to the beam method with a modified flexural angle of 15°. The use of multiple-component fibers, preferably in a segmented pie configuration, preferably as bicomponent fiber, which are partially, preferably predominantly, non-split and thermally solidified, results in a good flexural rigidity of the filter medium, which simplifies further processing, for example in filter elements, and at the same time results in a good air permeability.

The filter medium may further comprise a meltblown material in embodiments. A spun-bonded nonwoven according to the invention can serve, for example, as a carrier for a meltblown material, a meltblown nonwoven, and together with this form a multilayered filter medium. Different combinations of meltblown fabric layers and spun-bonded nonwoven layers are conceivable.

In one embodiment of the filter medium according to the invention, the spun-bonded nonwoven is provided with the at least partially, preferably mostly non-split, multi-component segmented pie fibers, preferably bicomponent fibers with a microfiber layer, in particular with a nanofiber layer, i.e. a layer in which the average fiber diameter is less than 1 μm.

Other embodiments with combinations of the spun-bonded nonwoven according to the invention with meltblown layers and ultra-fine fiber layers are, of course, conceivable.

It is also possible for the filter medium to comprise adsorber particles, for example activated carbon or other adsorber materials, for filtering or adsorbing volatile substances. The filter medium is suitable for removing hydrocarbons from air to be filtered.

In particular, activated carbon can be applied to the spun-bonded nonwoven according to the invention and can be fixed with a further layer, for example a meltblown nonwoven or with adhesive threads or adhesive dots. Such a layer can be covered with further layers, for example one or more meltblown fabrics or even one or more spun-bonded nonwovens.

Filter Medium: Material Compositions

In embodiments of the filter medium, the first plastic component and/or the second plastic component consist(s) of a polypropylene. It is advantageous that the first plastic component has a first melting point and the second plastic component has a second, different, melting point. The first melting point is then preferably higher than the second melting point, and between the first and the second melting point is a difference of at least 8 K. Preferably, the difference in melting points is at least 10K, and more preferably at least 15K.

By adjusting the melting points to each other, a favorable adhesive bond between the plastic components and thus the pie segments along the length of the multi-component fibers can be achieved and a good connection or crosslinking of the multi-component fibers with one another can be achieved in the production of the spun-bonded nonwoven according to the invention or of the filter medium according to the invention. The circular, pie-shaped fiber shape should also be maintained under thermal loads, e.g. during solidification, during the production process.

In embodiments, the mass fraction of the first plastic component is between 60 and 80%, preferably between 65 and 75%. By changing the mass fraction of the plastic component, mechanical properties of the multi-component fibers can be determined. Of course, the plastic components may also comprise mixtures and blends of a plurality of plastic materials, for example a plurality of thermoplastic materials.

In embodiments of the filter medium, the first plastic component and/or the second plastic component has/have a first portion of a first thermoplastic material having a first melting point and a second portion of a second thermoplastic material having a second melting point. By selecting the proportions of the first and second thermoplastic material, the resulting melting points for the plastic components or other properties such as viscosity can be adjusted. This facilitates the production in the spinning process.

In embodiments of the filter medium, in particular one of the two plastic components of different multi-component fibers for solidifying the spun-bonded nonwoven is partially fused together. For example, it is possible for a plastic component having the lower melting point within the fibers to fuse upon thermal solidification and fibers to adhere to each other, thereby forming a fiber network.

In embodiments, the first thermoplastic material is a polypropylene homopolymer. The second thermoplastic material may then be in particular a metallocene polypropylene. It is also conceivable that the first or second thermoplastic material is a co-polypropylene.

In embodiments, the sheet spun-bonded nonwoven in a respective area of 10 cm$^2$ has a rigidity such that it is self-supporting. The spun-bonded nonwoven is in particular thermally made more rigid. By "self-supporting", it is understood that the area of 10 cm2 does not sag, deflect or break under the weight.

Filter Medium: Filtration Properties

The spun-bonded nonwoven of the filter medium in embodiments has an air permeability at 200 Pa of between 500 l/m²s and 6000 l/m²s. The air permeability is measured in particular according to EN ISO 9237.

In embodiments, the spun-bonded nonwoven has a NaCl retention capacity at 0.3 μm particle size of greater than 10%. In embodiments, a NaCl retention capacity of greater than 30%, and preferably greater than 40%, is achieved. In particularly preferred embodiments, the spun-bonded nonwoven has a NaCl retention capacity of greater than 50%. The retention capacity is, for example, determined according to DIN 71460-1.

But also spun-bonded nonwovens can be provided, for example as a carrier material in a filter medium, in which the NaCl retention capacity is less than 10%.

In embodiments, the spun-bonded nonwoven has a dust holding capacity with a differential pressure increase of 50 Pa of greater than 20 g/m², preferably greater than 30 g/m². In embodiments, dust storage capacities of more than 40 g/m², and preferably more than 50 g/m², may also be achieved at 50 Pa. The dust storage capacity is, for example, determined according to DIN 71460-1.

A particularly open filter medium may be adapted to remove particles of the test dust according to ISO 12103-1 from an air stream with a filtration speed of 0.10 to 0.30 m/s, based on the filter medium surface, with an air permeability of more than 3000 l/m²s (determined according to ISO 9237 at 200 Pa). The filtration characteristics can be determined, for example, according to DIN 71460-1.

A filter medium of particularly high arrestance may be adapted to pass particles of the test dust according to ISO 12103-1, as well as NaCl aerosol particles according to DIN 71460-1, from an air stream with a filtration speed of 0.10 to 0.30 m/s, based on the filter medium surface, with an air permeability of more than 600 l/m²s (determined according to ISO 9237 at 200 Pa). The filtration characteristics can be determined, for example, according to DIN 71460-1.

Filter Elements: Construction

In embodiments, a filter element comprises a spun-bonded nonwoven as further described hereinbefore or hereinafter which is formed at least in part of multi-component segmented pie fibers having at least a first plastic component and a second plastic component, wherein a portion of multi-component fibers whose pie segments are interconnected at inner segment boundaries of the multi-component fibers along their length extension, is at least 50%, preferably 70%, more preferably 80%.

In a further embodiment, the proportion of the multi-component segmented pie fibers on the spun-bonded nonwoven is more than 50%, preferably more than 80%.

In particular, the filter element may comprise a filter medium having a spun-bonded nonwoven as described above or below. The filter medium is preferably pleated into a pleat pack in a zigzag shape. By pleating in a zigzag shape, the total filter surface contained in the pleat pack is increased.

Due to the mechanical properties of the spun-bonded nonwoven, which result in particular from the largely non-split multi-component fibers in the manner of segmented pie fibers, an easily handled and processable pleat pack can be produced.

In embodiments of the filter element, said filter element comprises sidebands on opposite pleat profiles of the pleat pack. Headbands mounted on opposite end pleats of the pleat pack may also be provided. Due to the fibers used and the resulting stability, such as rigidity and separation efficiency of the filter medium, it is also possible to form filter elements which have no end pleat reinforcement or headbands. This is created by a simple and inexpensive producible filter element.

The filter element comprises, for example, the proposed spun-bonded nonwoven as a filter medium or filter material and one or more stabilizing elements, in particular sidebands and/or headbands (also referred to as frontlets), which stabilize the filter medium at least in sections, in order to maintain its shape, in particular in the filter operation. The stabilizing elements can in particular form a closed or open frame—also in one piece of material—which surrounds the filter medium.

Alternatively or in addition to the filter medium, the stabilizer element(s), for example the sidebands and/or headbands referred to herein, may comprise the spun-bonded nonwoven. As an alternative or in addition, other apparatus components of the filter element according to the invention may also comprise the spun-bonded nonwoven.

The stabilizing elements can be materially connected to the edge of the filter medium, in particular adhesively bonded or welded. For this purpose, the stabilizing elements can be heated and the filter media are pressed into the heated material. Alternatively, the stabilizing elements may be molded onto the filter medium. Furthermore, an adhesive may be used as filler material. The stabilizing elements may themselves be made of the same material as the filter medium. Alternatively, the stabilizing elements may be formed as synthetic injection molded components. The stabilizing elements can be rigid or flexible.

The filter element may further comprise a seal which seals a raw side associated with the filter element with respect to a clean side thereof. The seal may be identical in construction to one or more stabilizing elements of the filter element. Alternatively, the seal may be formed as an additional component. For example, the seal may be attached to the filter medium, the one or more stabilizing elements, the filter element or the filter holder.

The filter medium can be pleated or even wavy. For example, zigzag M or W pleats are known as pleats. The filter medium can be embossed and then pleated sharp-edged at embossing edges to form pleating edges. The starting material used is a flat material sheet of the spun-bonded nonwoven, which is correspondingly re-shaped. Furthermore, the filter medium can additionally be felted or needled. The filter medium may have, in addition to the spun-bonded nonwoven, natural fibers such as cotton, or synthetic fibers, for example of polyester, polyphenylsulfide or polytetrafluoroethylene. The respective fibers may be oriented in, skewed and/or transversely to the machine direction during processing.

Furthermore, the filter medium may have an antimicrobial and/or antiallergenic effect. Zinc pyrithione or nanosilver, for example polyphenol as an antiallergenic substance, is considered as an antimicrobial substance.

Filter Elements: Applications

A corresponding filter element serves to filter fluids, i.e. gaseous and/or liquid media, for example air. A gaseous medium or air herein also includes gas-solid or air-solid mixtures and/or gas-liquid or air-liquid mixtures. For example, an air conditioner may have the filter element.

In embodiments, the filter element is an interior air filter element for a motor vehicle. The filter element is usually a replacement part that is changed after a certain lifetime. The favorable properties of the filter medium with respect to the filter characteristics and the mechanical properties allow a prolonged use, or period of use at a high filtration performance.

The filter element or the filter assembly can be used in passenger cars, trucks, construction machines, watercraft, rail vehicles, aircraft and in general in air conditioning technology, especially in air conditioning appliances, in household appliances, office equipment, such as computers, printers or copiers, in fuel cells or in building technology. These passenger cars or vehicles can be operated electrically and/or by means of fuel (especially petrol or diesel). In terms of building technology, in particular stationary or mobile facilities for the treatment of air come into consideration. In internal combustion engines, but also in compressors, cleaning of the intake air for both the combustion air and for the air that is to be compressed with the filter element is possible.

Filter Elements: Shape

The filter element has, for example, outer boundary surfaces enclosing a cuboidal volume. As a rule, the pleating edges of the pleat pack have the largest boundary surface, and the pleat height or pleat depth determines the size of the other boundary surfaces.

The two, in particular largest, boundary surfaces have in each case an area between 0.05 and 0.066 $m^2$. For example, the length of the largest boundary surface is between 290 and 295 mm, and the width is 196 to 201 mm. In further embodiments, the pleat pack has, for example, an upper bounding surface of between 0.053 and 0.062 $m^2$. In other embodiments, areas between 0.056 and 0.06 $m^2$ are possible.

Corresponding sizes can be filled in a favorable zigzag pleated manner with the help of the filter medium, so that the respective required filter area is achieved. Due to the good filter medium with respect to its filter properties and its mechanical properties of the filter material with the spun-bonded nonwoven of mainly non-split multi-component fibers, the surface can be reduced in principle with the same filter performance over conventional filter media. This leads to a material saving.

In embodiments, the filter element has a filter medium with an area between 0.458 and 0.472 $m^2$. This area, which is preferably between 0.462 and 0.47 $m^2$, can be arranged by the zigzag-shaped pleating within the pleat pack with its predetermined boundary areas. In other embodiments, the filter medium has an area between 0.464 and 0.468 $m^2$. Most pleats of the pleat pack are arranged transversely to the machine direction. The pleat pack may then have, for example in the machine direction, a length of between 285 and 300 mm and comprise between 38 and 46 pleats. The pleat heights are, for example, between 25 and 31 mm. Such a dimensioned filter element shows a particularly good separation efficiency when it is equipped with the filter medium from the multi-component fibers.

Production Method

A spun-bonded nonwoven according to the invention can be produced as follows. By means of at least one spinnerette, at least multi-component fibers, in particular bicomponent fibers, are spun, which in particular have a segmented pie configuration. The multi-component fibers can also be spun together with other fibers as a mixture of fibers. Subsequently, the multi-component fibers are cooled by means of at least one cooling apparatus, the fibers are drawn and deposited on a storage screen belt to the nonwoven web. The fabric web is subjected to hot-fluid solidification, wherein the fabric web is thereby applied flat with hot fluid and in addition pressure is exerted extensively on the fabric web during hot fluid application.

Preferably, hot air is applied to the nonwoven web in a first solidification stage on the storage screen belt. Following this, or following the dropping on the storage screen belt, the nonwoven web is applied flat with hot air in a second solidification stage, in a double belt furnace, wherein additionally and at the same time surface pressure is exercised on the nonwoven web. The flat pressure is applied to the nonwoven web at a pressure of between 5 and 15 Pa.

Preferably, multi-component fibers or bicomponent fibers are used in which a component forms more than 50% by weight, preferably more than 60% by weight of the total fiber, and wherein this component preferably consists of a polyolefin and very preferably of a polypropylene.

The first flat hot fluid solidification on the storage screen belt can be executed as a pre-solidification in a flow-through furnace. In this case, a fluid temperature is used which is below the melting point of the highest-melting component of the fibers and in which at least one component with a lower melting point—in the case of bicomponent fibers, the component of the bicomponent fibers with a lower melting point—is fused or melted. Thus, these fibers connect at the contact points with the adjacent underlying fibers. In this way, a transportable nonwoven web composite is produced, which is then supplied to the second solidification stage. Expediently, the nonwoven web is subjected to the flow of a hot fluid, in particular hot air, in the first solidification stage or in the first hot-fluid solidification of the hot fluid with a flow velocity of 1 to 3 m/s.

In the second solidification stage in the double belt furnace, the final solidification and calibration of the nonwoven web takes place. For this purpose, the fabric web is clamped between two circulating endless belts or screen belts, preferably between a conveyor belt and a height-adjustable calibration belt arranged above it. With the help of the two screen belts, flat pressure is exerted on the fabric web, which is flowed through or at the same time by the hot fluid or by the hot air. In the second solidification stage, the temperature is below the melting point of the component of the fibers with highest melting point. Expediently, at least one component of the fibers with lower melting point—in the case of bicomponent fibers, the component with lower melting point—is melted or partially melted. The nonwoven web is flowed in the double belt furnace by hot air with a flow velocity of 1 to 3 m/s. The temperature of the hot air for the first hot-fluid solidification and/or for the second hot-fluid solidification is at least 100, preferably 120 to 160° C.

Following the second solidification stage or following the second hot air solidification, the nonwoven web can be electrically charged. The electrical charging takes place after cooling the nonwoven web in the context of the second hot-fluid solidification. The electrical loading of the nonwoven web is carried out by guiding the nonwoven web by a static electric field, wherein the electrical charging device for charging the nonwoven web has two to three loading beams, each having 30 kV. Methods and apparatus for the electrostatic charging of nonwoven materials are given in U.S. Pat. No. 5,401,446, to which full reference is made herein ("incorporation by reference"). The devices of FIGS. 1 to 4 of U.S. Pat. No. 5,401,446 shown therein and described are used in embodiments of the method for charging the multi-component fibers.

In a spun-bonded nonwoven produced in the spun-bonded method, the fibers are spun with the spinnerette as continuous filaments. The term "fibers" can also be replaced by "continuous filaments" or "filaments".

In principle, it is also possible to use mixtures of the different configurations of segmented pie configuration, core/shell configuration and/or a side-by-side configuration of the bicomponent filaments or multi-component filaments. The plastic components of the multi-component filaments or the two plastic components of the bicomponent filaments expediently have in most cases different melting points.

In the case of the multi-component filaments or with bicomponent filaments, a component forms more than 50% by weight, preferably more than 55% by weight, preferably more than 60% by weight and very preferably 65 to 75% by weight of the total filament.

At least one component, preferably both or all components of the multi-component filaments or bicomponent filaments, consists of a polyolefin. Conveniently, this polyolefin is polypropylene. Polyolefin blends can also be used for the components of the continuous filaments. The terms "polyolefin" and "polypropylene" also include corresponding blends of polyolefins or of polypropylenes or copolymers of polyolefins or of polypropylenes.

The spun-bonded webs or nonwoven webs produced in this way have a grammage of between 10 and 1000 g/m2, preferably between 40 and 250 g/m2.

A spun-bonded nonwoven produced according to the invention may be part of a laminate of a plurality of layers, wherein at least one layer or part of the layers is likewise formed from spun-bonded nonwovens or nonwoven webs. Here, for example, meltblown fabrics can be used. According to a variant embodiment, the laminate or layer aggregate can have a gradient of the fiber diameter or filament diameter with respect to the extent of its thickness. Such a laminate or layer aggregate can be produced, in particular, by means of a plurality of spinning bars connected in series.

In embodiments of the method, the first plastic component has a first melting point and the second plastic component has a second melting point. The first melting point is preferably higher than the second melting point, and between the first and second melting points, the difference is at least 5K. Preferably, the difference is at least 10K, or more preferably at least 12K. By setting melting points, a solidification of the spun filaments and the deposited filaments can be achieved.

In embodiments of the manufacturing method, the first and second starting materials are separately melted and fed to a spinning beam having nozzle openings. The nozzle openings are then arranged such that segmented filaments are formed from the first and second plastic components.

In a variant of the method, a plurality of spinning beams with nozzle openings are used.

In carrying out the method, the filaments can be stretched by means of a primary air supply, swirled by means of secondary air supply and deposited into a web, in particular on a screen belt.

Uses

It is further proposed to use a filter medium or spun-bonded nonwoven described above or below. In this respect, the use of the filter medium or a filter element takes place for filtering a gas stream loaded with particles. The gas stream loaded with particles may, in particular, be supply air for the interior of a motor vehicle.

In embodiments, the filter medium is used in an interior air filter for a motor vehicle.

The embodiments and features described for the proposed filter media and spun-bonded nonwovens apply to the proposed production method and vice versa.

Other possible implementations of the invention comprise combinations of features or embodiments described previously or in the following regarding the exemplary embodiments, even if such combinations are not explicitly cited. The person skilled in the art will also add individual aspects as improvements or supplements to the specific basic form of the invention.

Further advantageous embodiments and aspects of the invention are the subject of the dependent claims and the embodiments of the invention described below. In the following, the invention will be explained in greater detail on the basis of preferred embodiments with reference to the enclosed figures.

In the figures, identical reference signs designate identical or functionally equivalent elements, provided no information is provided to the contrary.

EMBODIMENT(S) OF THE INVENTION

Spun-Bonded Nonwoven Made of Multi-Component Fibers as a Filter Medium

Figure 1:
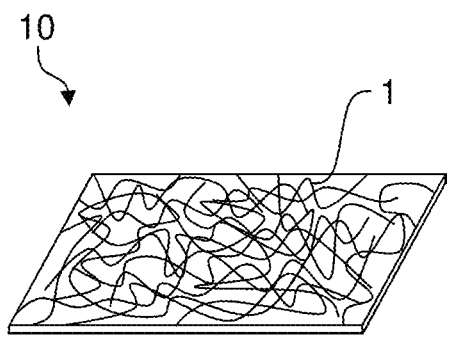
FIG. 1: shows a schematic view of an exemplary embodiment of a filter medium made of a spun-bonded nonwoven.

FIG. 1 shows a schematic view of an exemplary embodiment of a filter medium made of a spun-bonded nonwoven. A nonwoven is a structure of fibers which are joined together to form a nonwoven or a fibrous layer or a fibrous web. One also speaks of so-called nonwoven materials, as in nonwovens there is usually no crossing or entangling of the fibers, as is the case with webs or other, in particular textile tissues. In a spun-bonded nonwoven, in particular continuous filaments, which are also referred to as filaments, are joined together to form the nonwoven, which is indicated in FIG. 1 by the irregular arrangement of the fibers 1. Compared with known staple fiber nonwovens, the proposed nonwovens 10, as indicated in FIG. 1, have advantages when used as filter media.

In a spin-blown process or a spun-bonding process, the nonwoven 10 is produced by melting polymers and spinning them through a nozzle system into continuous filaments. These endless filaments are then exposed to an air stream which swirls the fibers or filaments. Subsequently, a deposition takes place to the web. Optionally, solidification methods can then be used, so that a flat material is produced, for example, for filtering particles in a gas stream.

The nonwoven material 10 shown in FIG. 1 comprises continuous fibers which are segmented. That is, a respective fiber, which may be referred to as a multi-component or poly-component fiber, is formed from a first and a second plastic component. In the production process, the liquid plastic components are led separately through nozzles or holes and combined to form a single continuous fiber.

Figure 2:
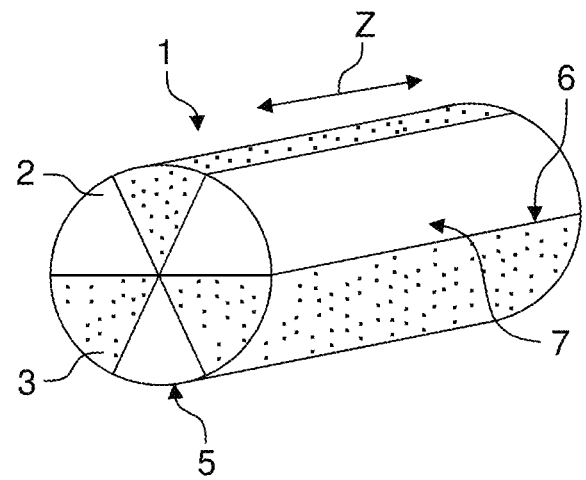
FIG. 2: shows a schematic perspective view of an exemplary embodiment of a multi-component fiber for use in a filter medium.

In FIG. 2, an example of a multi-component fiber 1 is indicated. In the schematic illustration of FIG. 2, one can see a fiber 1 which has a sheath surface 7 along its length extension Z. In FIG. 2, the fiber 1 is indicated in a preferred embodiment as a cylinder. In fact, the fiber 1, as indicated in FIG. 1, may have irregular bends and curves.

In FIG. 2, a cross-sectional area of the multi-component fiber 1 is visible on the front side. It can be seen first pie segments 2, which extend along the length Z of the fiber 1, and second segments 3, which also extend along the length Z. The segments 2 consist of a first plastic component, and the segments 3, which are shown dotted, of a second plastic component. Due to the nature of the production in the spin-blown process, molten plastic components nestle together as continuous filaments to the multi-component fiber 1. In the example of FIG. 2, there are six segments which are arranged in the manner of pie pieces in cross-section. They are also known as so-called segmented pie fibers.

The two plastic components 2, 3, which are also referred to as segments below, lie side by side and adhere to one another. Along the length extension Z, there are outer segment boundaries 6 between the two plastic components or the segments 2, 3. Since the multi-component fiber 1 is formed as a solid material, internal segment boundaries 4 also result between the segments 2, 3. Other geometries of multi-component fibers are also conceivable. In addition to the pie segments, an expression as a core-sheath structure with an additional plastic component or one of the plastic components of the pie segments in the interior of the fiber or a fiber with pie segments is also conceivable, which has a cavity inside, yet having outer segment boundaries present on the outer surface.

Figure 3A:
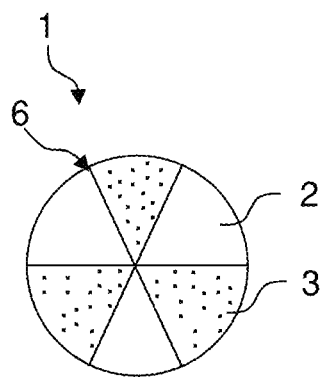
FIG. 3A to 3C: show schematic cross-sectional views of further embodiments of multi-component fibers.

FIG. 3 shows by way of example schematic cross-sectional views of further exemplary embodiments. In FIG. 3A, the cross-section of a multi-component fiber 1, as indicated in FIG. 2, is shown in cross-section. (Pie) segments 2 can be seen again in cross-section 3 of a first plastic material and second segments 3 of a second plastic material. The composition can be the same. The circumference of the fiber 1 is denoted by 5. In FIG. 3A, six segments are indicated with six outer boundary lines 6. Of these, only one is provided with reference numerals for the sake of clarity. It is also possible to provide multi-component fibers with a different segmental division. For example, juxtaposed segments can be created so that outer segment boundaries result at the resulting sheath surface.

Figure 3B:
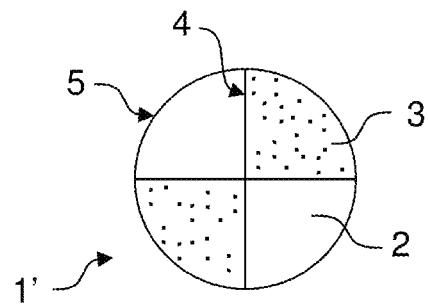

FIG. 3B shows a multi-component fiber 1' in cross-section having four segments 2, 3. In the production, for example, four nozzles are combined in a spinning beam in such a way that fibers with a corresponding cross-section are formed.

Figure 3C:
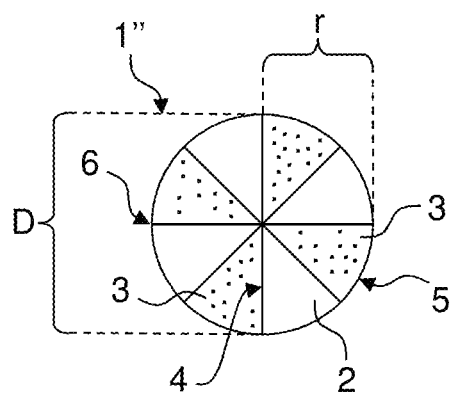

In FIG. 3C, yet another multi-component fiber 1" is indicated in cross-section. The multi-component fiber 1" has eight segments 2, 3 and accordingly also eight outer segment boundaries 6. The diameter of the fiber is denoted by D. The multi-component fiber 1" has, for example, a diameter of 10 µm. In known spun-bonded nonwovens, the segments 2, 3 are split after the production of the continuous filaments in order to produce smaller or thinner fibers. This is not desired in the nonwoven material proposed herein and is therefore rather or even as far as possible avoided. In the nonwoven material 10 shown in FIG. 1, the fibers retain their segmented composition, i.e., the fibers are substantially non-split.

Figure 4A:
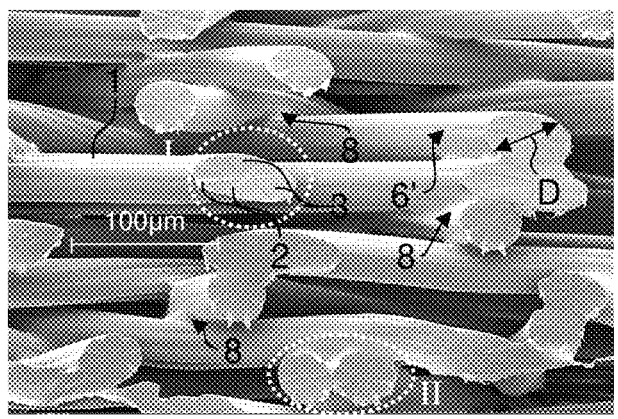
FIG. 4A to 4C: shows scanning electron micrographs of sections of embodiments of spun-bonded nonwovens.
Figure 4B:
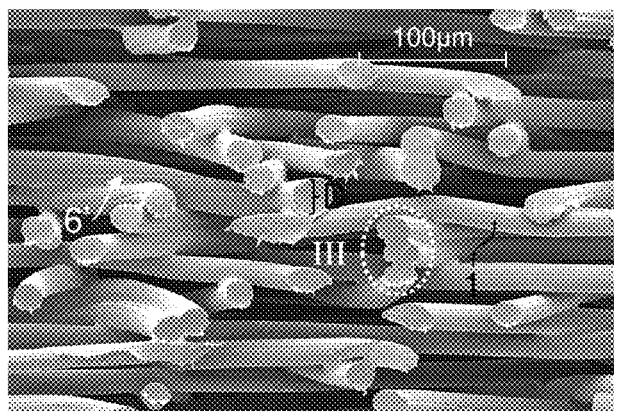
Figure 4C:
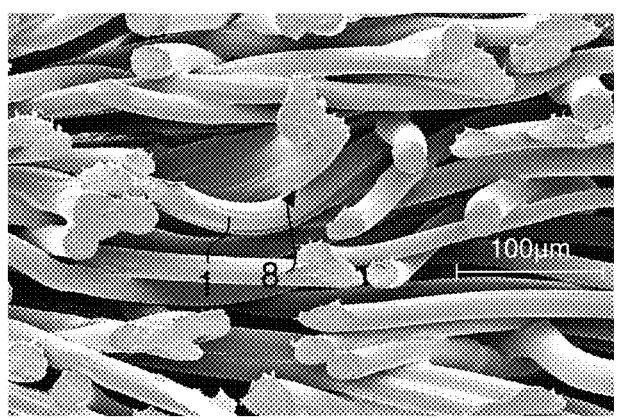

FIGS. 4A to 4C show scanning electron micrographs of sections of such spun-bonded nonwovens for use as a filter medium. The plastic components of the fibers in region I shown in FIG. 4 are both formed from a thermoplastic polyolefin provided with a lower meltable additive. The segments 2, 3 can be seen on the marked fiber in cross-section on the example of FIG. 4A. The representation essentially corresponds to the schematic representation, as it is indicated in FIG. 3C, in which case the segments 2 are smaller than the segments 3. There are 16 segments in total in FIG. 4A which are visible. Grooves 6' can be seen along the length extension of the respective peripheral surface at the outer segment boundaries 6 of the fibers 1. The diameter D of the fiber is about 30 µm. The fibers 1 indicated in FIG. 4A are solidified into a spun-bonded nonwoven. In other words, the web, which was deposited by the spin-blown process, is thermally treated in such a way that, at the boundary points 8 or contact surfaces between separate fibers, they are fused together. This is indicated by the arrows 8 in FIG. 4A. It can be seen in particular in the lower marked area II, as the two adjacent fibers or segments are fused together.

The thermoplastic polypropylene material used for the preparation is thus provided with an additive, for example, a polypropylene metallocene homopolymer, which has a lower melting point than the base propylene. For example, the polypropylene PPH 9099 can be used, available from Total Research & Technology, Feluy, which is a homopolymer, and as additive, a polypropylene available under the name Lumicene MR 2001 from the same manufacturer can be used. To adjust the melting point, it is also conceivable to use a polypropylene copolymer, for example Adflex Z 101 H, which is available from LyondellBasell Industries Holdings B.V.

It is possible to perform differential scanning calorimetry on the fibers to detect, for example, two different melting points. In a corresponding investigation, which is also referred to as DDK analysis or differential scanning calorimetry (DSC) analysis, a thermal analysis is carried out to measure the amount of heat emitted or absorbed by a sample during heating, cooling or an isothermal process. The sample is, for example, a certain amount of the spun-bonded nonwoven. By means of DDK analyzes in accordance with DIN EN ISO 11357-1, several melting points or melting temperatures of the polymer mixtures can be detected.

As a result of using corresponding thermoplastic materials as plastic components, spun-bonded nonwovens, as shown in FIGS. 4A to 4C, can first be simply spun and then solidified. FIG. 4B shows another spun-bonded nonwoven as an SEM (Scanning Electron Microscope) image. The diameter D of the fibers is less than shown in FIG. 4a, and is about 10 to 15 µm. In the marked area III, it can be seen how three of the endless fibers stick together and yet are completely non-split. The choice of materials and the production ensures that the fibers are as non-split as possible. Outer segment boundaries can also be seen in FIG. 4B extending along the fibers 1 emerging as grooves 6'.

FIG. 4C shows a further section of a fabric material with even thinner multi-component fibers 1. Also in FIG. 4C, it can be seen how the fibers 1 were solidified together by thermal exposure. That is, at the interface between the fibers 1, the materials are fused together.

Compared to fabric materials formed from split multi-component fibers, the multi-component fibers proposed herein have a relatively smooth surface. However, for example, due to the thermal treatment on the sheath surfaces, grooves are formed between segments by the material transition. Along a circumference 5 (see FIG. C) of a corresponding multi-component fiber 1, a certain roughness is created through the grooves 6'. This is indicated schematically in FIG. 5.

Figure 5:
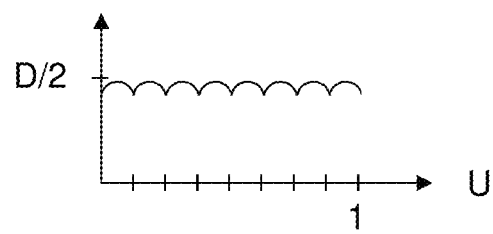
FIG. 5: shows a diagram for explaining a roughness depth of multi-component fibers.

FIG. 5 shows a diagram in which the circumference U of a single multi-component fiber is indicated on the x-axis and the respective radius r on the y-axis. The radius r has 6 minima at the locations of the outer segment boundaries and deviates from the average radius D/2. It is thus possible to indicate a roughness along a respective circumference of a fiber.

A possible measure of the roughness or smoothness of the sheath surface along a circumferential line is the average roughness depth Rz. In the investigated multi-component fibers, the average roughness depth Rz is less than 2 μm. For example, the average surface roughness Rz can be determined according to ISO 4287/1. For example, a circumferential line of a fiber is considered as a measuring section. The circumference is then divided into seven individual measuring sections, whereby the middle five measuring sections are selected to be the same size. For each of these individual measuring sections, the difference between the maximum and minimum values is determined on the circumference of the profile.

Partially Split Multi-Component Fibers

In FIG. 5, the minima and maxima of the radius would result in a respective minimum and maximum. The mean value is then formed for these determined single roughness depths. Due to the relatively smooth surface of the sheath surface 7 in the multi-component fibers 1, this average roughness depth is rather low. The spun-bonded nonwovens usable as filter medium (see FIG. 1) are the multi-component fibers preferably non-split and have a rather smooth peripheral line or sheath surface.

The known applications of segmented pie or otherwise differently multi-component segmented fibers require splitting them into the segments in order to achieve smaller fiber units. This is done for example by an influence of a water jet. They are also known as a hydrodynamic needling of corresponding fragmentary fibers. Usually, as explained in US 2002/0013111 A1, certain polymer materials are used for the various segments, which enable easy splitting after the spinning process. For example, polyester materials having aromatic or polylactic acid moieties are known.

The investigations of the applicant have revealed that thermoplastic polymer materials, such as polyolefins, and in particular polypropylenes, are particularly well suited to produce multi-component fibers which are less split and are also particularly resistant to known split processes. It can already be seen in FIGS. 4A to 4C that even in the thermally solidified state, the multi-component fibers have coherent segments. Preferably, the proportion of partially split fibers is small.

Figure 6:
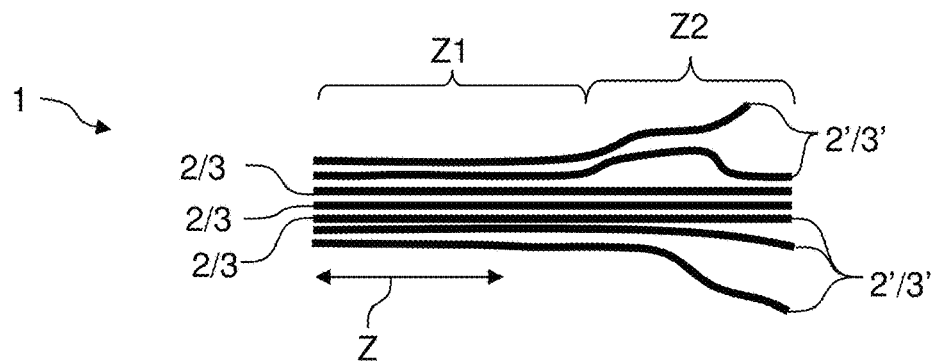
FIG. 6: shows a schematic representation of an exemplary embodiment of partially split multi-component fibers.

In FIG. 6, for example, a fiber is indicated schematically. The dark curves represent contiguous segments 2, 3 of a multi-component fiber 1. The length extension of the multi-component fiber 1 is indicated by Z. It can be seen in a length range Z1 that the segments 2/3 are stuck together and non-split. These segments are indicated with 2/3. As a result of impacts during the production process or during the further processing of the nonwoven materials, the fibers can basically split up. This means that individual segments are formed, which are detached from the rest. This is designated in section Z2 by 2'/3'.

In the example of FIG. 6, the ratio between the portion Z1 and the portion Z2 may be selected as a measure for splitting on the one hand or for a non-split length fraction of a fiber. Assuming that the total length of the examined fiber is Z1+Z2, there is a length fraction of the multi-component fiber 1 of Z1/(Z1+Z2) in which the segments 2, 3 of the multi-component fiber are not split or separated. In the example of FIG. 6, approximately 60% length fraction is seen to be non-split. Conversely, the length fraction of the multi-component fiber 1 indicated in FIG. 6, in which the pie segments 2'/3' of the fiber is split from each other, is at about 40%. Preference is given to filter media in which the spun-bonded nonwoven is composed of as many non-split multi-component fibers as possible.

A corresponding determination of the length fraction of one or more multi-component fibers which are not split can be effected, for example, by a sample of a predetermined section, for example 1 mm$^2$ or 1 cm$^2$, of the flat spun-bonded nonwoven.

An alternative way of determining the splitting portion in a spun-bonded nonwoven of multi-component fibers may be the proportion of multi-component fibers in a sample that are non-split. For example, the spun-bonded nonwovens shown in the cutouts in FIGS. 4A to 4C are formed almost entirely of non-split multi-component fibers. A multi-component fiber can be classified as split if several segments detach, as is the case in the length range Z2 of the fiber 1 of FIG. 6, for example. For example, in a volume or area section of a spun-bonded nonwoven, the proportion of multi-component fibers having split-off or split segments can be counted. This is preferably not more than 50%.

The more non-split multi-component fibers exist in the spun-bonded nonwoven, the better the filtration properties. What is desired is a very high proportion of multi-component fibers, in which the segments are connected to one another along their segment boundaries in the length extension.

Steps in the Production Process of the Spun-Bonded Nonwoven

Figure 7:
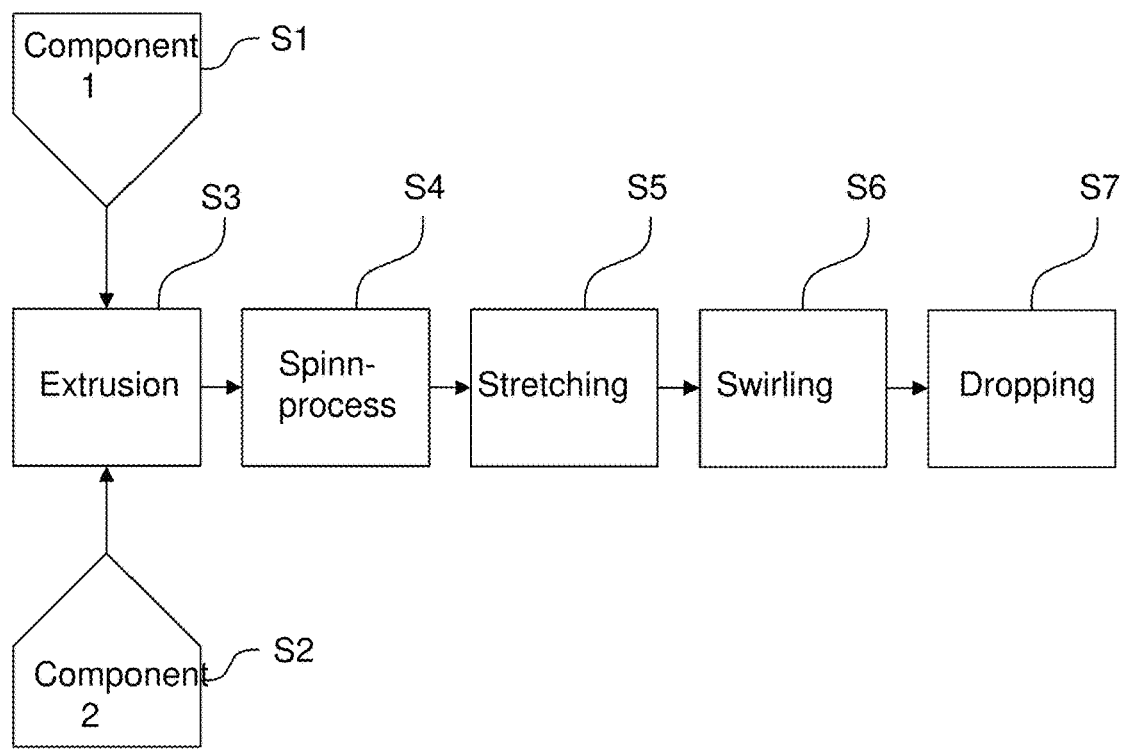
FIG. 7: shows a schematic representation of method steps of an exemplary embodiment for producing a web of segmented pie filaments.
Figure 8:
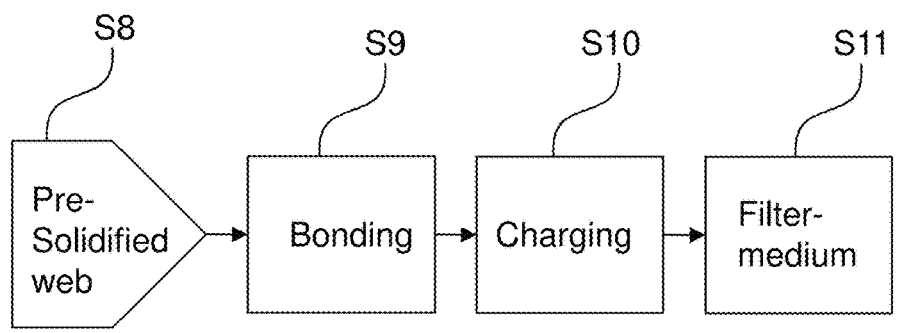
FIG. 8: shows a schematic representation of method steps of an embodiment for producing a filter medium with the aid of a web, as described in FIG. 7.

FIGS. 7 and 8 schematically show method steps in a production method for a filter medium made of a spun-bonded nonwoven. In FIG. 7, the steps are shown in order to produce a web from first and second plastic components, and in FIG. 8, the processes for forming a solidified filter medium from the web are indicated.

In a first step, the starting materials for the first plastic component and the second plastic component are provided. This is indicated in FIG. 7 by method steps S1 and S2. In the exemplary embodiment of a production method indicated below, the first component and the second component have a different composition. For example, the starting material of the first plastic component is a thermoplastic polyolefin. In particular, the PPH 9099 polypropylene available from Fa. TOTAL has proven to be suitable. PPH 9099 is a homopolymer polypropylene with a melting point of 165° C. More characteristics of possible thermoplastic polyolefins AM, MB, MC are shown in this table.

TABLE 1

| | Name | Manufacturer | Type | Melting point (ISO 3146) | Melt Flow Index (ISO 1133) |
|---|---|---|---|---|---|
| MA | PPH 9099 | Total | ho-PP | 165° C. | 25 g/10 min |
| MB | Lumicene MR2001 | Total | m-PP | 151° C. | 25 g/10 min |
| MC | Adflex Z101H | LyondellBasell | co-PP | 142° C. | 27 g/10 min |

The starting material of the second component is chosen to have a lower melting point. For this purpose, for example, several portions of thermoplastic polyolefins can be used. A mixture of a polypropylene available from Fa. TOTAL has proven to be suitable under the names Lumicene MR 2001, in the following MR2001. The melting point is 151° C. MR 2001 is a metallocene homopolymer made from polypropylene. The second component may be added to another polypropylene, such as, for example, the Adflex Z 101 H available from LyondellBasell, hereinafter Adflex, having a melting point of 142° C. The mass fraction of the starting materials of the first component with the second component is, for example, 70% to 30%. For the first component, which consists of a single thermoplastic material, for example the aforementioned PPH 9099, one can also speak of a base material.

The mass ratio between the ratio of MR 2001 to Adflex Z 101 H in the starting material of the second component is, for example, about 75 to 25%. In this case, the starting materials can be prepared by mixing appropriate granules of the thermoplastic materials.

The starting materials of the first and second components are correspondingly metered in steps S1 and S2 and fed to an extrusion device in step S3. The molten starting materials are fed by means of an extruder in step S3 to a bonding beam with corresponding nozzles for forming the segment geometry. Optionally, filters and pumping devices may be present in the stream of the liquefied respective thermoplastic polymer.

In step S4, a spun-bonding or spin-blown process is carried out in which endless filaments with the segmented pie structures are formed from the nozzles. From the spinning process, in step S4, segmented pie filaments are obtained from the first and second plastic components. By an air stream effect, the filaments are stretched and swirled and then deposited in particular on a screen belt. This is indicated in the method steps S5, S6 and S7.

The stretching S5 is done by a suitable primary air supply, and the swirling S6 downstream in the manufacturing process by secondary air. This results in a web during the dropping S7 of segmented filaments, which can also be referred to as multi-component filaments. The resulting web then has a thickness of between 1 and 2 mm.

In an optional step, it is possible to thermally pre-solidify the web by sucking the filaments on the one hand through the filing screen or screen belt, and on the other hand by solidifying or pre-solidifying with the aid of, for example, hot air or other thermal exposure. One can call this web a semi-finished product that already has spun-bonded nonwoven properties. In principle, this semi-finished product can already be used for filtering fluids.

In order to achieve an even better, also mechanical, property of the spun-bonded nonwoven from multi-component segmented pie filaments, a further solidification takes place. This is indicated schematically in FIG. 8. The pre-solidified web is guided in a bonding or solidification step S9 between spaced screen belts, rolls or rollers and simultaneously exposed to a temperature which is higher than the melting temperature of at least one of the two plastic components. For example, when using the polypropylene materials previously listed in the table, thermal bonding can occur at temperatures between 150 and 158° C. The thermally solidified spun-bonded nonwoven then has a thickness of between 0.5 and 1.5 mm, for example. The thickness can be adjusted by the spacing of the screen belts or heatable rolls or rollers.

In the proposed production method, in particular no apparatus for hydrodynamic solidification, needling or chemical solidification or bonding are used. This reduces the amount of split multi-component fibers in the spun-bonded nonwoven.

In a subsequent step S10, the solidified spun-bonded nonwoven is charged. Charging takes place, for example, with the aid of wire or rod electrodes, which opposite rollers, over which the flat and rollable spun-bonded nonwoven is guided. In particular, an apparatus and a charging method can be used for this purpose, as explained in U.S. Pat. No. 5,401,446. U.S. Pat. No. 5,401,446 is hereby incorporated by reference ("incorporation by reference"). Investigations by the applicant have shown that, in particular, a stage charge, as shown for example in FIG. 1 of U.S. Pat. No. 5,401,446, is favorable with the aid of two successively connected charging drums and charging electrodes.

Subsequently, the obtained charged spun-bonded nonwoven is provided as a filter medium, for example, in roll form (step S11). Throughout the entire production path of the spun-bonding process, the multi-component fibers remain non-split or largely non-split. In the case of thermal solidification in step S9, for example, only a part of the thermoplastic material is melted from the starting materials and leads to the interconnection of different multi-component fibers.

The flat filter medium of a single-layer spun-bonded nonwoven is now provided in particular in roll form. High quality filter media can be achieved from the sheet material due to the filtration properties, but also due to the mechanical handling in terms of its flexural rigidity.

Comparison of the Mechanical Properties of the Filter Medium with Comparative Nonwovens The applicant has carried out comparative investigations, for example on the flexural rigidity of spun-bonded nonwovens made according to the proposed method, with materials processed in commercially available filter elements. A filter element of the type CU 3054 distributed by the manufacturer MANN+HUMMEL GmbH was examined.

In the following table, the flexural rigidities of a test nonwoven are compared with those of comparative nonwovens. Commercially available filter elements are partly manufactured with filter medium from different manufacturers. Comparative nonwovens 1, 2 and 3 are based on commercially available filter media for interior filters.

TABLE 2

| Sample | Type | Flexural rigidity according to DIN 53121 | | |
|---|---|---|---|---|
| | | Front | Back | Medium |
| Test nonwoven 1 | Spun-bonded nonwoven | 210 mN | 219 mN | 214.5 mN |
| Comparative nonwoven 1 | Meltblown | 157 mN | 165 mN | 161 mN |
| Comparative nonwoven 2 | Meltblown | 149 mN | 149 mN | 149 mN |
| Comparative nonwoven 3 | 2-ply | 63 mN | 51 mN | 57 mN |

The test nonwoven 1 used two plastic components. Three thermoplastic materials MA, MB and MC were used, with MA PPH 9099, MB MR2001 and MC Adflex being chosen. The first plastic component essentially comprises MA. The second plastic component essentially comprises a mixture of MB and MC in the ratio 3:1. Overall, the mass ratio in the fiber is: MA: 70%, MB: 22.5% and MC: 7.5%. A spun-bonded nonwoven of the grammage or a weight per unit area of 100 g/m² was produced and investigated using a system available from Reifenhäuser Reicofil as test nonwoven 1. The thickness of the spun-bonded nonwoven was 1.14 mm with a weight of 106 g/m². The measurements were carried out according to DIN 29076-2 or DIN 29073-1. There were sixteen pie segments in the fibers.

The comparative nonwoven 1 can be used for a commercial filter element CU3054 of the manufacturer MANN+HUMMEL GmbH and is made of a polypropylene with a grammage of 125 g/m² and has a thickness of 1.25 mm.

The comparative nonwoven 2 can be used for a commercial filter element CU3054 of the manufacturer MANN+HUMMEL GmbH and is made of a polypropylene with a grammage of about 146.5 g/m² and has a thickness of about 1.15 mm.

The comparative nonwoven 3 can be used for a commercial filter element CU3054 of the manufacturer MANN+HUMMEL GmbH and is made of a two-ply polyester/polypropylene material with a grammage of about 105 g/m² and has a thickness of 0.6 mm. The carrier layer made of polyester is provided with a meltblown layer of polypropylene.

It can be seen that, compared to conventional comparative media based either on spun-bonded or multilayered materials, they have improved flexural rigidity. This allows a particularly good further processing, for example in filter elements made of zigzag-pleated filter media.

Possible Additional Equipment of Filter Media

Figure 9:
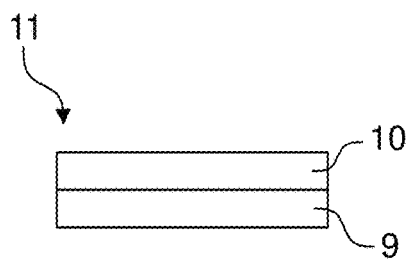
FIG. 9: shows a schematic sectional view of an exemplary embodiment of a multilayer filter medium.

In FIG. 9, a further embodiment for a filter medium 11 is indicated. The embodiment comprises a first filter layer 9, for example of a meltblown material, onto which a spun-bonded nonwoven 10 is applied, which is composed essentially of non-split multi-component fibers.

Figure 10:
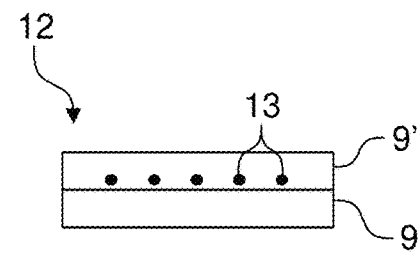
FIG. 10: shows a schematic sectional view of a further exemplary embodiment of a multilayer filter medium.

In order to further improve or change the filtration properties, it is possible, as indicated in FIG. 10, to embed adsorbent particles 13 in or between layers of filter media. For example, the filter medium 12 has a first layer of a meltblown material 9 and a second layer of the described spun-bonded nonwoven 9'. In between, for example, adsorbent particles 13 of activated carbon or other adsorbent agents are embedded. As a result, volatile hydrocarbons, for example, can be retained in addition to particle filtration when the filter medium 12 passes through.

Filtration Properties of Filter Media

The applicant has produced further test webs and examined their properties. In the following table 3, the thicknesses, the air permeability, the grammage and the flexural rigidity are shown for test nonwovens 1 to 4.

TABLE 3

| Sample | Thickness (DIN 29076-2) | Air permeability (DIN 9237) | Grammage (DIN 29073-1) |
|---|---|---|---|
| Test nonwoven 2 | 0.86 mm | 4,500 l/m²s | 88 g/m² |
| Test nonwoven 3 | 0.90 mm | 2,323 l/m²s | 90 g/m² |
| Test nonwoven 1 | 1.14 mm | 1,809 l/m²s | 106 g/m² |
| Test nonwoven 4 | 1.18 mm | 1,705 l/m²s | 124 g/m² |

For the test nonwovens 2, 3 and 4, the same starting material was used as for the test nonwoven 1 for the two plastic components of the segments.

Table 4 lists the filtration properties of the test nonwovens.

TABLE 4

| Sample | NaCl deposition efficiency at 0.3 μm (DIN 71640-1) | ISO A2 initial separation at 1 μm (DIN 71460-1) | ISO A2 initial separation at 5 μm (DIN 71460-1) | ISO A2 dust retention capacity at 50 Pa (DIN 71460-1) |
|---|---|---|---|---|
| Test nonwoven 2 | 24% | 80% | 87% | 65 g/m² |
| Test nonwoven 3 | 43% | 88% | 95% | 34 g/m² |
| Test nonwoven 1 | 47.3% | 94.4% | 97.5% | 36.2 g/m² |
| Test nonwoven 4 | 52% | 93% | 98% | 34 g/m² |

Pleated Filter Media and Filter Elements

Figure 11:
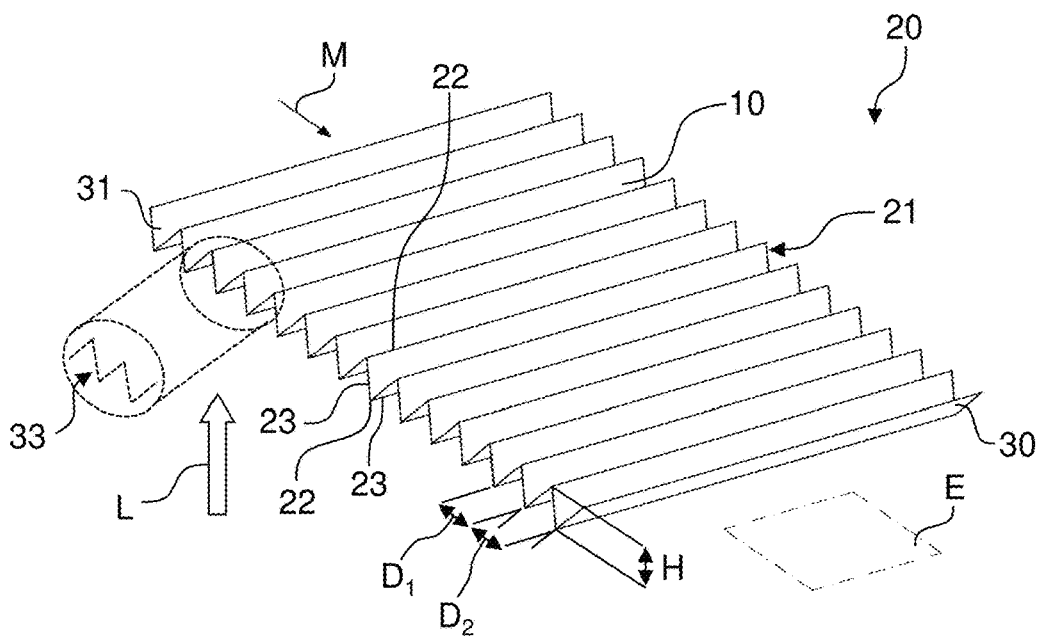
FIG. 11: shows a perspective view of an exemplary embodiment of a pleat pack formed from a filter medium.

In the following FIG. 11, a zigzag-pleated medium is shown as a pleat pack 20. The filter medium 10 accordingly has pleats 21, which typically extend transversely to the machine direction M. The pleated filter medium is also referred to as a pleat pack 20 or pleated. The pleats 21 may be produced by pleating along sharp pleat edges 22 (also referred to as pleat tips) or by a wavy embodiment of the filter medium 10. A respective pleat 21 may be defined by two pleating sections 23, which are connected to one another via a corresponding pleating edge 22. According to the exemplary embodiment, the pleated edges 22 point in or against the direction of flow, which is indicated in FIG. 11 by the arrow L.

A pleat in which the pleats 21 have a varying height H is also possible. Further, the pleat spacing between the pleats 21 may vary so that the distance $D_1$ is not equal to the distance $D_2$. The pleat pack 20 may be designed to be self-supporting, i.e. the pleats 21 are dimensionally stable in the case of an intended flow in the filter operation.

The filter medium 10 used is limited in the machine direction M by end pleats 30, 31. Transverse thereto, the filter medium 10 is bounded by pleat end edges 19, 20 (also referred to as pleat profiles 33). "Pleat end edge" refers to the end face pleat surface which extends between adjacent pleat edges 33 of a respective pleat 22.

The filter medium 10 may have a rectangular shape in plan view, that is, in the plane E of its planar extension. However, a triangular, pentagonal or polygonal, round or oval shape is also conceivable.

Figure 12:
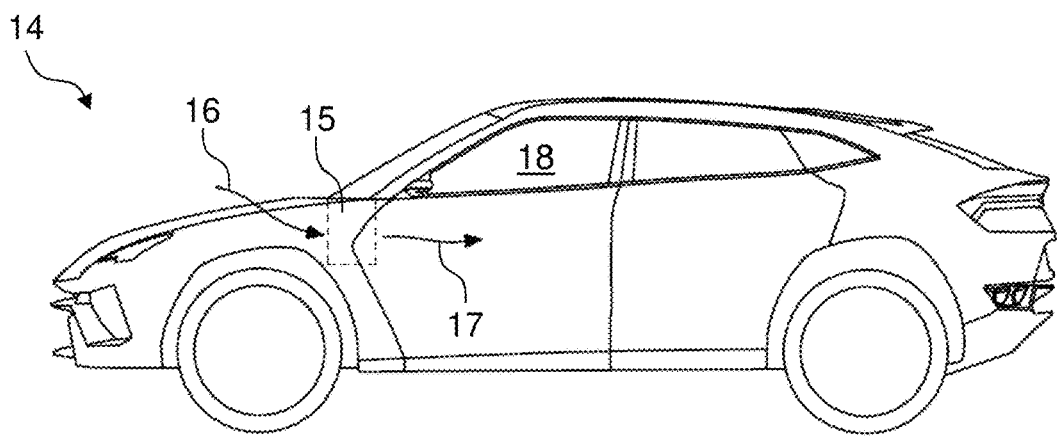
FIG. 12: shows a schematic representation of a general motor vehicle with a filter arrangement.

One possible application is the use of the respective filter medium in interior air filters for motor vehicles. FIG. 12 shows a motor vehicle 14 with an air conditioner 15, which may be formed as a heating air conditioner. The air conditioner 15 receives outside air 16 and supplies filtered air 17 to a cabin 18 (also referred to as a passenger compartment) of the motor vehicle 14. For this purpose, the air conditioner 15 comprises a filter arrangement shown in FIG. 13.

The filter arrangement 24 comprises a filter housing 19 with an interior filter 32 accommodated therein, in particular exchangeably. The interior filter 32 is shown in more detail in FIG. 14. The interior filter 32 comprises a filter medium pleated as a pleat pack 20 (see. FIG. 11), which in particular is all around connected to a frame 25. The frame 25 may include, for example, sidebands 26, 27 and headbands 28, 29.

Figure 14:
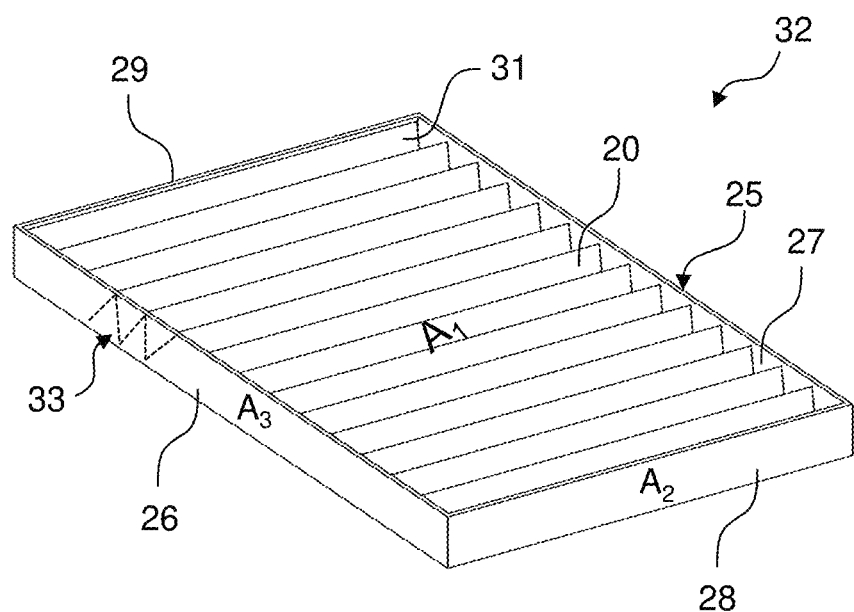
FIG. 14: shows a perspective view of the interior filter of FIG. 13 including a frame and a pleat pack.

The sidebands 26, 27 shown in FIG. 14 are connected to the pleat end edges 33, the headbands 28, 29 to the end pleats 30, 31, in particular by fusing, abrasing or gluing. The sidebands 26, 27 and the headbands 28, 29 may form the frame 19 in one piece or in several parts. The sidebands 26, 27 and the headbands 28, 29 can be made, for example, from a particularly flexible fiber material or as in particular rigid synthetic injection molded components. In particular, the frame 19 may be produced by injection molding on the pleat pack 20.

Figure 13:
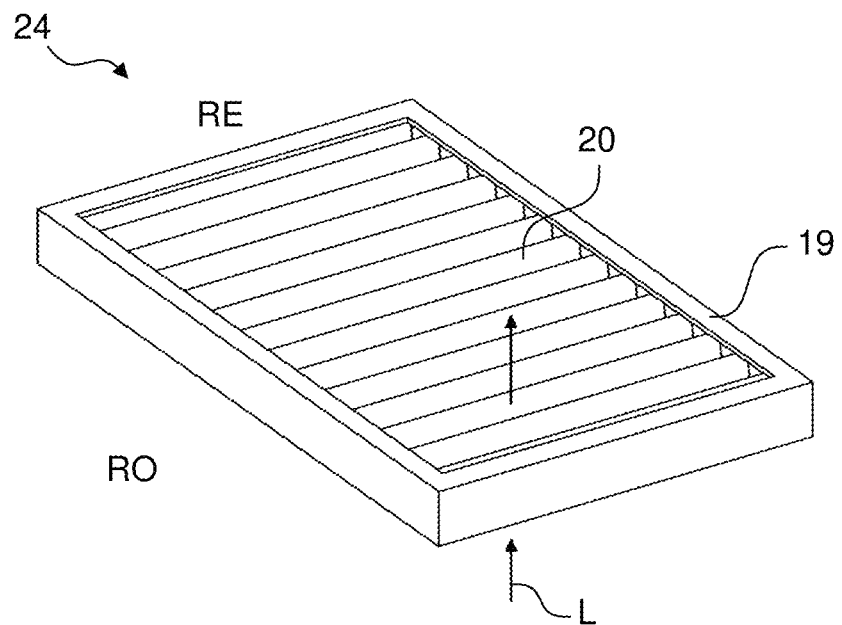
FIG. 13: shows a perspective view of the filter arrangement from FIG. 12, comprising a filter housing with a passenger compartment filter accommodated therein.

In filter operation, the filter medium 10, as shown in FIG. 11 or 13, flows perpendicular to its flat extent of air L. The air L flows from a raw side RO of the cabin air filter 8 toward a clean side RE thereof.

In order to ensure a sufficient seal between the raw and clean sides RO, RE, a seal between the cabin air filter 32 and the filter housing 19 may be provided. The seal may, for example, be integrated in the frame 25. In this case, the frame 25 is at least partially formed of a sealing material. Alternatively, the seal can be provided as an additional part, for example, attached, in particular be molded, onto the frame 25.

The filter element 32 reproduced in FIG. 14 surrounds a cuboidal volume with the boundary surfaces $A_1$, $A_2$, $A_3$. The largest boundary surface $A_1$ corresponds to the outflow or inflow side of the filter element 32.

Filtration Properties of the Pleat Pack

The applicant has carried out comparative investigations in which prior art filter elements, namely CU 3054 interior air filter elements manufactured by MANN+HUMMEL GmbH, have been compared with filter elements of identical geometrical design. The comparison and test filter elements have a shape as shown in FIG. 14. The test filter elements are equipped with a respective spun-bonded nonwoven made of multi-component fibers produced by the method proposed herein. The spun-bonded nonwovens were solidified and subjected to a charge. For this purpose, three electrode arrangements each having a voltage between the electrode and the winding roll of 25-35 kV have been used. The distance to the spun-bonded nonwoven was about 20 to 40 mm, and the running speed along the electrode assemblies was between 30 and 40 m/min. The flat spun-bonded nonwoven present as rolled goods was then subjected to zigzag pleating and provided with sidebands and headbands according to CU 3054.

Each filter element tested has a length extension of 292±1.5 mm, a width of 198.5±1 mm and a height of 30±1 mm. This results in pleat heights H=28 mm with a total of 42 pleats in the resulting pleat pack. The pleat spacing $D_1=D_2$ is 7 mm. The filter area is thus 0.466 m² for a cover area $A_1$ of the filter element of 0.058 m² (see FIG. 9, 14). The commercially available filter elements are available with different retention capacities. In the commercial comparative filter elements, a filter medium is used, made of a meltblown nonwoven. Alternatively, a two-ply material of high retention polyester and polypropylene can be used.

Figure 15:
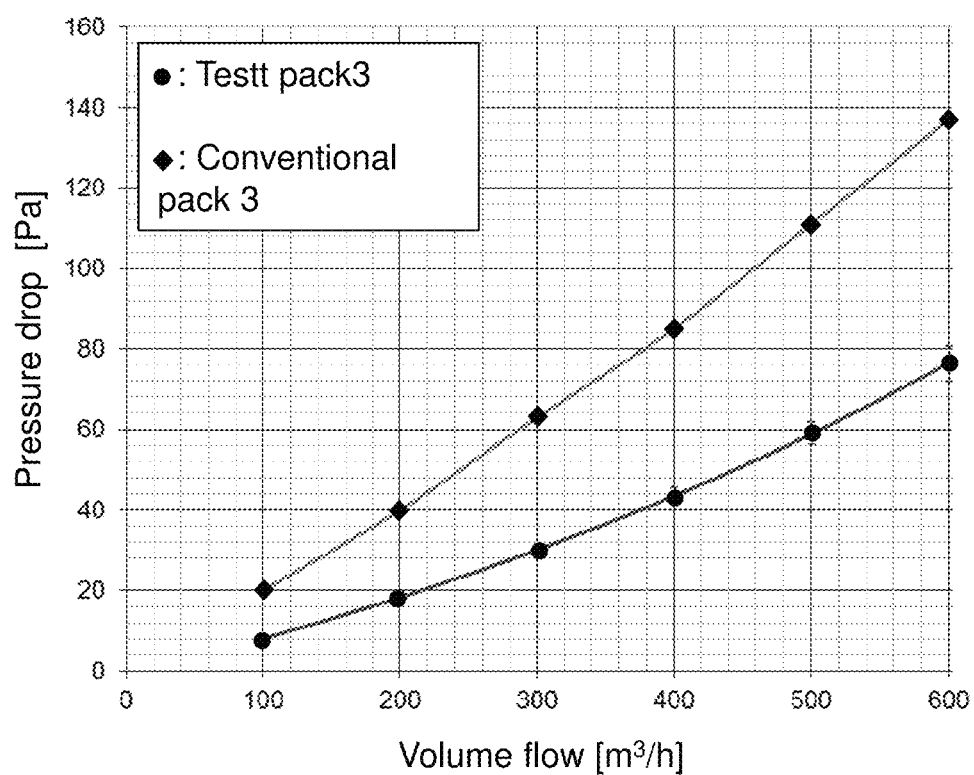
FIG. 15: shows pressure difference curves for filter elements with different filter media.

FIG. 15 shows curves from pressure drop measurements of a test pack 3 for the filter grade D and a commercial filter element CU 3054 having a conventional filter medium. Over the entire volume flow range of 100 to 600 m³/min, the filter element with a pleat pack of multi-component spun-bonded fibers substantially non-split in the filter element (Test pack 3) provides better results than the prior art filter medium (Comparison pack 3).

From the following table, it can be seen that the proposed single ply spun-bonded nonwovens of propylene blends result in improved rates of separation and improved pressure drops. All measurements were carried out in accordance with DIN 71460-1.

TABLE 5

| Sample | Pressure drop at 600 m³/h | NaCl deposition efficiency at 0.3 µm | ISO A2 initial separation at 1 µm | ISO A2 initial separation at 5 µm |
| --- | --- | --- | --- | --- |
| Comparison pack 1 | 39 Pa | 12% | 46% | 66% |
| Test pack 1 | 36 Pa | 24% | 79% | 86% |
| Comparison pack 2 | 58 Pa | 20% | 69% | 94% |
| Test pack 2 | 55 Pa | 39% | 92% | 96% |
| Comparison pack 3 | 137 Pa | 54% | 95% | 99% |
| Test pack 3 | 77 pa | 49% | 95% | 98% |

In this respect, a filter element made from the proposed spun-bonded nonwoven is superior to the known filter element materials. This applies in particular with regard to the flexural rigidity of the filter medium, the retention capacity and the dust storage capacity. The higher the requirements for filter media and filter elements, the better the proposed spun-bonded non-spliced multi-component fibers.

REFERENCE SIGNS USED

1 Multi-component fiber
2, 3 Segments/plastic component
4 Inner segment boundary
5 Circumference
6 Outer segment boundary
6' Longitudinal groove
7 Sheath surface
8 Junction
9 Meltblown material
10 Spun-bonded nonwoven
11 Filter medium
12 Filter medium
13 Adsorber particles
14 Motor vehicle
15 Air conditioner
16 Outside air
17 Filtered air
18 Interior
19 Filter housing
20 Pleat pack
21 Pleat
22 Pleat edge
23 Pleat section 24 Filter arrangement
25 Frame
26 Sideband
27 Sideband
28 Headband
29 Headband
30 End pleat
31 End pleat
32 Interior air filter
33 Pleating profile
$D_1$, $D_2$ Pleating distance
$A_1$, $A_2$,
$A_3$ Boundary surface
E Level
H Pleat height
L Air flow
M Machine direction
U Circumference
D Diameter
Z Length extension
RO Raw air area
RE Clean air area

What is claimed is:

1. A filter medium for filtering a fluid, the filter medium comprising:
multi-component segmented pie fibers (1);
a spun-bonded nonwoven which is formed at least partially of the multi-component segmented pie fibers (1), each fiber having:
a sheath surface (7) comprising a radially outer circumferential surface,
a length extension (Z),
a first plastic component (2) forming first pie segments, and
a second plastic component (3) forming second pie segments,
adjoining pie segments which are joined together side by side at inner segment boundaries (4) of the adjoining pie segments, the joining of these segments being present along at least 50% of the length extension of the fiber,
wherein each adjoining pie segment comprises a first pie segment joined to a second pie segment,
wherein for each adjoining pie segment, the pie segments therein are adjoined along the sheath surface,
wherein the sheath surface (7) includes longitudinal grooves (6') formed along outer segment boundaries (6), the outer segment boundaries located between the adjoining pie segments (2, 3),
wherein the first and second plastic components (2, 3) adjoin one another along the sheath surface (7).

2. The filter medium according to claim 1, wherein each sheath surface (7) has an average roughness depth (Rz) of less than 2 μm along its circumference.

3. The filter medium according to claim 1, wherein one or more of the multi-component segmented pie fibers (1) have at least four of the pie segments (2, 3).

4. The filter medium according to claim 1, wherein one or more of the multi-component segmented pie fibers (1) do not split apart under the influence of a water jet treatment.

5. The filter medium according to claim 1, wherein at least 70% of the of multi-component segmented pie fibers (1) have adjoining pie segments (2,3) joined together over at least 70% of their respective fiber's length extension (Z).

6. The filter medium according to claim 1, wherein the spun-bonded nonwoven (1) has a machine direction (M), and the multi-component segmented pie fibers (1) are oriented along the machine direction (M).

7. The filter medium according to claim 6, wherein the spun-bonded nonwoven (10) has a flexural rigidity in the machine direction (M) of more than 170 mN.

8. The filter medium according to claim 1, wherein the adjoining pie segments (2, 3) are partially fused together in areas of the inner segment boundaries (4).

9. The filter medium according to claim 1, wherein the multi-component segmented pie fibers (1) are interconnected exclusively by hot air bonding.

10. The filter medium according to claim 1, wherein the spun-bonded nonwoven (10) has a thickness (D) of between 1.0 mm and 2.0 mm.

11. The filter medium according to claim 1, wherein the multi-component segmented pie fibers (1) are thermally interconnected or thermally bonded together to form the spun-bonded nonwoven.

12. The filter medium according to claim 1, wherein the spun-bonded nonwoven (10) has a thickness of between 0.5 mm and 1.5 mm.

13. The filter medium according to claim 1, wherein the plastic components (2, 3) of the multi-component segmented pie fibers (1) are charged as electrets.

14. The filter medium according to claim 1, wherein the spun-bonded nonwoven (10) has a grammage of between 80 g/m² and 160 g/m².

15. The filter medium according to claim 1, wherein the filter medium (11) further comprises a meltblown material (9).

16. The filter medium according to claim 1, wherein the first plastic component (2) and/or the second plastic component (3) consist of a polypropylene.

17. The filter medium according to claim 1, wherein the first plastic component (2) has a first melting point (T2); and
the second plastic component (3) has a second melting point (T3);
wherein the first melting point (T2) is higher than the second melting point (T3) by at least 8 degrees K.

18. The filter medium according to claim 1, wherein a mass fraction of the first plastic component is between 20% and 80%.

19. The filter medium according to claim 1, wherein the first plastic component (2) and/or the second plastic component (3) has/have a first portion of a first thermoplastic material (MA) having a first melting point (TA) and a second portion of a second thermoplastic material (MB) having a second melting point (TB);
wherein the first melting point (TA) is higher than the second melting point (TB).

20. The filter medium according to claim 19, wherein the second thermoplastic material (MB) of different adjacent multi-component segmented pie fibers (1) is partially fused together to solidify the multi-component segmented pie fibers (1) into the spun-bonded nonwoven (10).

21. The filter medium according to claim 20, wherein the first thermoplastic material (MA) is a polypropylene homopolymer and/or the second thermoplastic material (MB) is a metallocene polypropylene.

22. The filter medium according to claim 20, wherein the spun-bonded nonwoven (10) is thermally solidified in a respective area of 10 cm² in such a way that the spun-bonded nonwoven (10) is self-supporting.

23. The filter medium according to claim 19, wherein a mass fraction of the first thermoplastic material (MA) is between 70% and 95%.

24. The filter medium according to claim 19, wherein the first thermoplastic material (MA) and/or the second thermoplastic material (MB) has/have a melt flow index (MFI) of between 20 g/10 min and 30 g/10 min.

25. The filter medium according to claim 1, wherein the spun-bonded nonwoven (10) has an air permeability of between 1,300 $l/m^2 s$ and 1,700 $l/m^2 s$.

26. The filter medium according to claim 1, wherein the spun-bonded nonwoven (10) has a NaCl retention capacity at 0.3 μm of greater than 20%.

27. The filter medium according to claim 1, wherein the spun-bonded nonwoven (10) has a dust storage capacity at 50 Pa of more than 20 $g/m^2$.

28. The filter medium according to claim 1, wherein the spun-bonded nonwoven (10) comprises pleats (21) with a plurality of pleat sections (23) arranged between pleat edges (22).

29. The filter medium of claim 28, wherein the pleats (21) extend transversely to a machine direction (M).

\* \* \* \* \*